United States Patent [19]

Hapgood

[11] 4,122,830
[45] Oct. 31, 1978

[54] SOLAR HEATING SYSTEM

[75] Inventor: William H. Hapgood, Concord, Mass.

[73] Assignee: Raytheon Company, Lexington, Mass.

[21] Appl. No.: 727,067

[22] Filed: Sep. 27, 1976

[51] Int. Cl.² .................................................. F24J 3/02
[52] U.S. Cl. ..................................... 126/271; 237/1 A; 165/171
[58] Field of Search ................. 126/270, 271; 237/1 A; 165/169, 170, 171

[56] References Cited

U.S. PATENT DOCUMENTS

| 2,065,653 | 12/1936 | Carruthers | 126/271 |
| 2,469,496 | 5/1949 | Christenson | 126/271 |
| 2,544,474 | 3/1951 | Swanton, Jr. | 237/1 A |
| 2,705,948 | 4/1955 | Rostock | 126/271 |
| 2,838,043 | 6/1958 | Bliss, Jr. | 126/271 |
| 4,000,851 | 1/1977 | Heilemann | 126/271 |
| 4,020,827 | 5/1977 | Broberg | 126/271 |

Primary Examiner—Kenneth W. Sprague
Assistant Examiner—James C. Yeung
Attorney, Agent, or Firm—Harold A. Murphy; Joseph D. Pannone; John T. Meaney

[57] ABSTRACT

A system utilizing solar energy collectors for heating water, which system embodies a piping circuit whereby water from a storage or supply tank is pumped in a continual upward path through the collectors to a peak elevation and thence through sized return piping so as to return with any entrapped air to the storage area, with the return piping being vented adjacent to the storage area to allow escape of such entrapped air to the storage area, with the return piping being vented adjacent to the storage area to allow escape of such entrapped air while the water is circulating through the system and to allow influx of air to replace water in the collectors when the pump is not operating.

10 Claims, 5 Drawing Figures

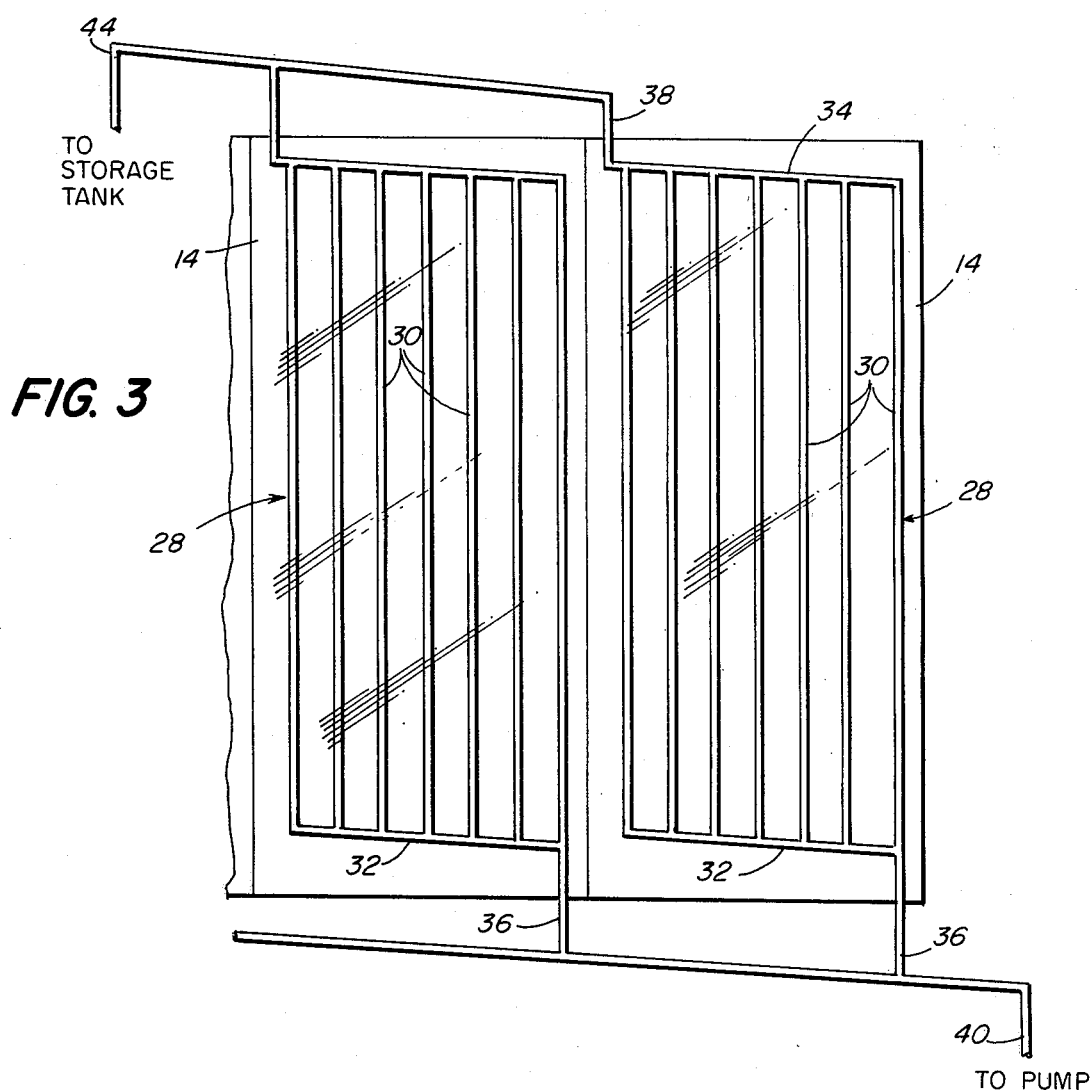
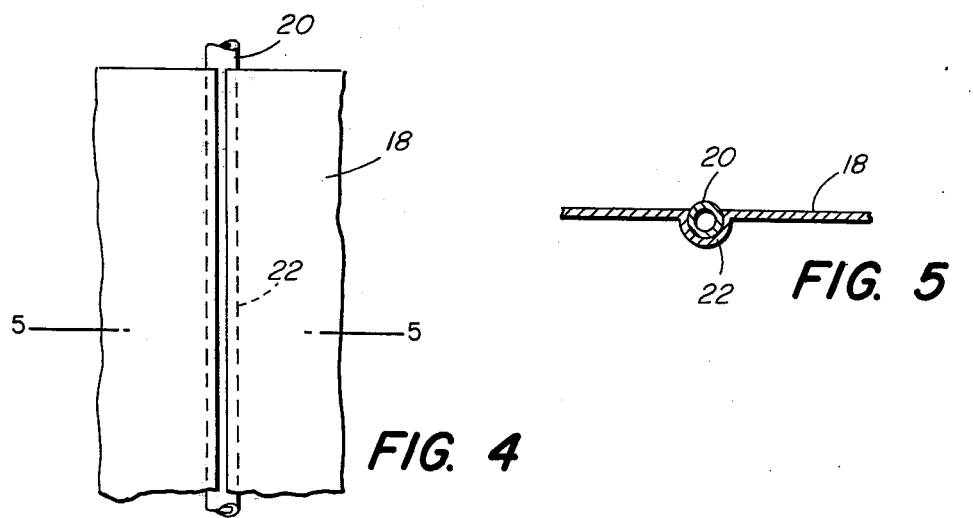

SOLAR HEATING SYSTEM

BACKGROUND OF THE INVENTION

Solar energy collectors for the heating of water have been made with a grid of substantially parallel pipes mounted in efficient heat conductive relation on a heat-absorbing panel, and the grids are connected by suitable piping to a supply tank containing water to be heated. The grids are also connected to the tank by return piping so that when a pump forces the water from the tank through the grids, the water will collect heat from the absorbers and will return as heated water to the tank for subsequent domestic or other use.

In such installations the solar collectors are usually mounted externally on a building which contains the water storage tank and are thus subject to severe atmospheric conditions, such as freezing temperatures, for example. This has necessitated the use of a suitable antifreeze solution in the water, or in the addition of temperature controlled devices for achieving the drainage of water from the collectors when the temperature reaches a selected low level.

The use of antifreeze in the water is highly undesirable, especially when the water is to be used domestically, because of the toxicity of known antifreeze solutions. Additional means for draining the water from the system is also highly undesirable because of the added cost. Furthermore, such electrical or mechanical means are subject to failure or breakdown and thus cannot provide assurance of continual failsafe operation.

In known solar collector piping circuits a vent valve is used at the high point of the system for allowing air to escape from the piping. However, the system must be operated at a pressure greater than atmospheric pressure and, therefore, any leaks will result in water being deposited undesirably in areas of a building to which access may be difficult.

SUMMARY OF THE INVENTION

The above and other disadvantages of and objections to known systems of this character are overcome in the present invention by the utilization of a system wherein failsafe operation is guaranteed even upon failure of the pump. The presently described system utilizes a minimum of materials and parts, with no fittings such as valves, for example, being required. Small feed and return pipes can be used; air purging is by pressure and is automatic and does not depend on unreliable vent valves; and draining of the collectors is automatic, efficient, and assured.

These advantages are achieved by a system including collectors, each of which has a grid of piping which is continually pitched downwardly so that water may flow away from the collectors when not being pumped or otherwise urged through the system. At the high point of the piping circuit there is connected one end of a return pipe which is connected at its other end to the storage tank or reservoir. A pump is inserted in the feed pipe for forcing water from the tank into the collectors and thence into the return pipe and tank to complete the circulation system.

The return pipe is sized to control water velocity through it so that any air collecting at the high point will be entrained and returned to the vicinity of the storage tank. This air may be removed in the tank or by a vent in the return pipe adjacent to the tank.

Once the water is circulating a siphon is formed, enabling the water to be circulated with little assistance from the pump. Once circulation has begun, the upper portions of the collector array operate below atmospheric pressure due to the siphon effect. Thus, leaks will leak air into the system rather than water out of it.

When the pump is intentionally or accidentally shut off, air enters the vent at the storage tank and travels up to the collectors while water returns through the feed pipe to the storage tank.

BRIEF DESCRIPTION OF THE DRAWINGS

The above and other objectives and advantages of the system will become apparent from the following description taken in connection with the accompanying drawings, wherein

FIG. 3 is an elevational view of a portion of an alternate type of collector array utilizing the invention;

FIG. 4 is an enlarged fragmentary elevational view of a collector panel; and

FIG. 5 is a horizontal sectional view taken substantially on line 5—5 of FIG. 4.

DESCRIPTION OF THE PREFERRED EMBODIMENTS

Figure 1:
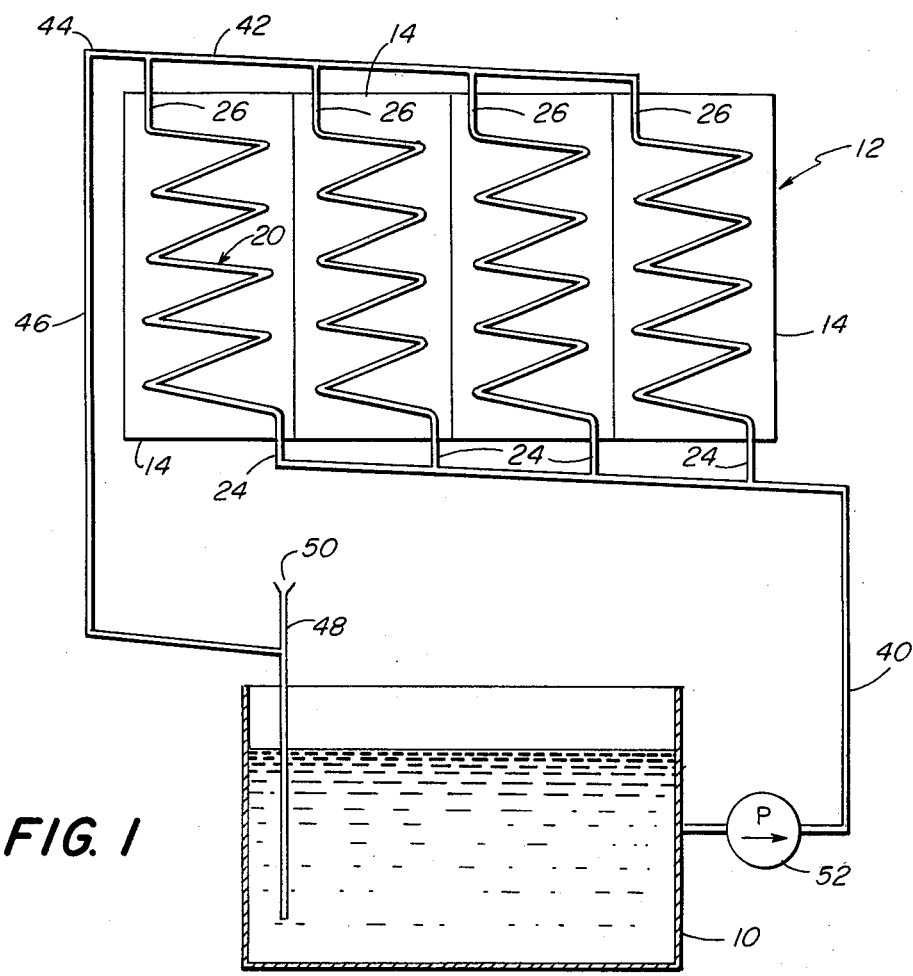
FIG. 1 is a diagrammatic illustration of a solar water heating system embodying the invention.

Referring more particularly to the drawings wherein like characters of reference designate like parts throughout the several views, the system shown in FIG. 1 includes a storage tank or reservoir 10 in which is the supply of water to be heated by the array 12 of solar collectors 14. The tank 10 is preferably located within an enclosure or building where it will normally not be subjected to freezing temperatures. The collector array 12 will be located in any desired position where it will be impinged by solar radiation, such as on the roof of a building or on the ground adjacent the building containing the tank 10.

The tank 10 may be a plastic, concrete, metal or other enclosure within which the water is retained. Each collector 14 is of basically conventional structure such as disclosed, for example, in U.S. Pat. No. 3,898,979, with modifications to be described.

Each collector 14 comprises an enclosure 16 (FIG. 2) in the bottom of which is an absorber plate 18 upon which solar radiation is made to impinge. Upon or within the plate 18 is disposed an interconnecting grid 20 of pipes through which water is made to flow, as will be described hereinafter. Any suitable means may be employed for locating the grid pipes 20 in efficient heat-conductive relation to the absorber plate 18 such as shown, for example, in FIGS. 4 and 5 wherein the plate 18 is provided with grooved portions 22 within which the pipes are enclosed. Thus, when the absorber plate 18 becomes heated by solar radiation, the heat is transferred from the plate through the walls of the pipes 20 to the water within the pipes.

Figure 2:
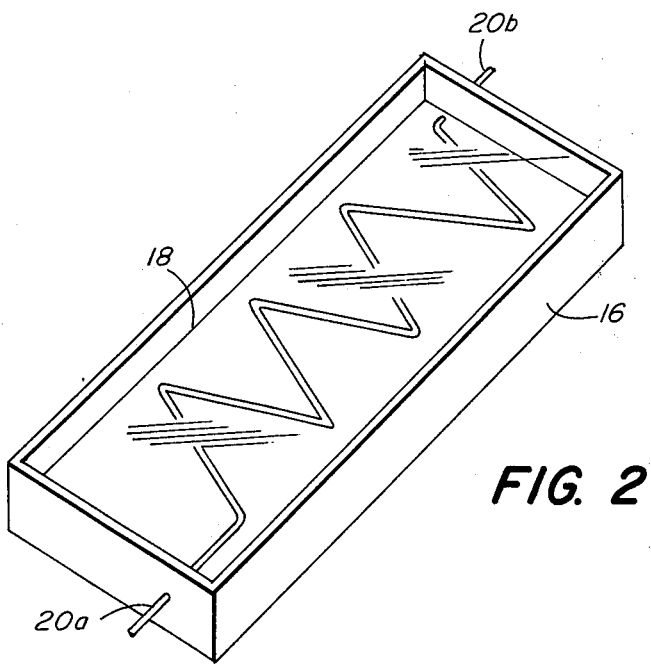
FIG. 2 is an isometric view of one of the collectors in the array shown in FIG. 1.

In accordance with this invention, since the collectors 14 are usually inclined to the horizontal so as to more efficiently intercept a maximum amount of solar radiation, the grid of pipes 20 is made to extend upwardly from a low point to a high point. For example, as shown in FIG. 2 the lower end of the grid 20 is at the bottom end of the enclosure 16 and is connected to an inlet pipe 24, and the upper end of the grid 20 is at the upper end of the enclosure and is connected to an outlet pipe 26. All piping within the enclosure 16 from point 24 to point 26 is pitched upwardly so that normally any water in the grid piping will flow downwardly out of end 24 unless urged in the upward direction by means such as a pump, as will be described.

Thus, the grid 20 may comprise several pipes interconnected in a continuous zig-zag fashion as shown in FIGS. 1 and 2. However, the grid may be constructed otherwise as shown, for example, in FIG. 3. In this embodiment the grid, designated by numeral 28, comprises a plurality of vertically extending substantially parallel pipes 30, all of which are connected at their lower ends to a common horizontally extending pipe 32. At their upper ends all of the vertically extending pipes 30 are connected to a common horizonatally extending pipe 34. Both horizontal pipes are inclined as shown, with the lower end of lower pipe 32 being connected to an inlet pipe 36 and the upper end of upper pipe 34 being connected to an outlet pipe 38. Thus, water throughout the grid 28 will tend to flow downwardly to inlet pipe 36 unless forced in the opposite direction.

The array 12 is supplied with water from tank 10 through a feed pipe 40 which is connected to the inlet pipe 24 of each collector 14. Feed pipe 40 at its upper end is also inclined. The outlet pipes 26 of the collectors are each connected to an upwardly inclined pipe 42 which is in turn connected at point 44 to a return pipe 46 which extends downwardly to the tank 10. A standpipe 48 is connected at its lower end to return pipe 46 at a point near the tank and at its upper end is provided with a vent 50.

A pump 52 is connected into the feed pipe 40 near the tank, and functions to force water upwardly through the feed pipe 40 and inlet pipes 24 into the grids 20, and then upwardly out of the grids through outlet pipes 26 and inclined pipe 42 to the return pipe 46.

While the water is flowing through the grids 20 it will absorb and be warmed by the heat from the collectors 14. This warmed water will be returned through return pipe 46 to the tank for subsequent recirculation.

In this system, once the water is circulating, a siphon is formed which assists in pulling the water out of the collectors. For starting circulation the pump must be able to pump up to the peak or high point 44 of the system. Accordingly, a relatively small pump such as, for example, one-third or one-fourth horsepower is usually sufficient if the high point 44 is about thirty-five feet above the pump, and then with circulation under way a flow of about twelve gallons per minute can be easily maintained.

In contrast to standard practice where a vent valve is located at the high point, the present invention utilizes a carefully sized return pipe 46 with no additional fitting whatever in this area of the system. Such sizing is done so that if any air collects in the pipes at the high point, the water velocity down the return pipe 46 will be sufficient to entrain the air and carry it toward the storage tank 10 where it will be removed through the standpipe vent 50. In practice a water velocity of five feet per second or more will perform this air removal function.

Once circulating, the upper portions of the collector array operate below atmospheric pressure because of the siphon effect, and any leaks along the upper manifold will therefore leak air into the system rather than leak water out of it. In most systems this will be an advantage since the air will not be detrimental to copper or plastic plumbing and storage tanks. Furthermore, the areas of the system most difficult to reach will not have to be perfectly water tight.

In further accordance with this invention, when the pump 52 shuts off for any reason either intentionally or accidentally as by power failure, for example, air enters through the standpipe vent 50 and travels up to the collectors 14 while the water returns through the feed pipe 40 to the storage tank. This is done automatically because the piping is all pitched downwardly from the high point 44 all the way to the storage tank which is located in heated space so that freezing will not be a problem. The system will thus drain completely.

From the foregoing it will be apparent that the presently described system embodies all of the objectives and advantages mentioned hereinbefore by utilization of a novel piping circuit which permits complete drainage upon discontinuance, accidentally or otherwise, of pump operation, thus assuring failsafe operation without the need for antifreeze solutions or other protective means.

It will also be apparent that various modifications and changes in the system shown and described may be made by those skilled in the art without departing from the spirit of the invention as expressed in the accompanying claims. Therefore, all matter shown and described is to be interpreted as illustrative and not in a limiting sense.

What is claimed is:

1. A solar energy system for heating a liquid comprising a reservoir for containing a supply of the liquid to be heated, at least one solar collector at a level higher than the reservoir, liquid conduit means in said collector including an inlet at a low point in the collector and an outlet at a high point in the collector, and piping connecting said inlet to said outlet, said piping throughout its length being pitched upwardly from the inlet to the outlet, a feed pipe connected at one end to said reservoir and pitched upwardly toward and connected to said inlet, a return pipe connected at one end to the reservoir and pitched upwardly therefrom to a peak level point above said outlet, a connector pipe connected to said outlet and pitched upwardly therefrom toward and connected to said peak level point of the return pipe, and pump means in said feed line for pumping liquid from the reservoir through the feed line, inlet, piping, outlet, connector pipe, and return pipe.

2. A system as set forth in claim 1 wherein a vent is inserted in the return pipe adjacent to said reservoir.

3. A system as set forth in claim 1 wherein at least a portion of said return pipe is sized to increase the velocity of liquid flowing through the return pipe sufficiently to entrain within the liquid air which may collect at said peak level point.

4. A system as set forth in claim 1 wherein a plurality of solar collectors are connected at their respective inlets to said feed pipe and at their respective outlets to said connector pipe.

5. A system as set forth in claim 1 wherein a plurality of said solar collectors are disposed above said reservoir, each collector having a respective inlet and outlet, and said connector pipe is connected to all of said outlets, and a second connector pipe is connected to all of said inlets and is inclined downwardly therefrom and is connected at its lower end to said feed pipe.

6. A solar energy system for heating a liquid comprising at least one inclined solar collector having conduit means therein including an inlet as its lower end, an outlet at its upper end, and a grid of conduits connected at its lower end to said inlet and extending continuously upwardly therefrom toward and connected to said outlet, a liquid storage tank at a level below said collector, a piping circuit connected at one end to the storage tank and extending continuously upwardly therefrom to and connected with said conduit means, said piping circuit including a feed pipe connecting said tank with said inlet and a return pipe connecting said tank with said outlet, said return pipe having a discrete portion thereof located at the peak level of the system, with all portions of the system being pitched downwardly from said discrete portion, and pump means connected with said feed line for forcing liquid through the system.

7. A system as set forth in claim 6 wherein a vent is inserted in the return pipe adjacent to said storage tank.

8. A system as set forth in claim 6 wherein at least a portion of said return pipe is sized to increase the velocity of liquid flowing through the return pipe sufficiently to entrain within the liquid air which may collect at said peak level point.

9. A system as set forth in claim 6 wherein a plurality of said solar collectors are disposed above said reservoir, each collector having a respective inlet and outlet, and said connector pipe is connected to all of said outlets, and a second connector pipe is connected to all of said inlets and is inclined downwardly therefrom and is connected at its lower end to said feed pipe.

10. A system as set forth in claim 6 wherein a plurality of solar collectors are connected at their respective inlets to said feed pipe and at their respective outlets to said connector pipe.

* * * * *